Dec. 5, 1944.  J. J. DE LA ROZA, SR  2,364,133

SEAL JOINT

Filed Jan. 3, 1944

INVENTOR.
Joaquin de la Roza, Sr.

BY
ATTORNEY.

Patented Dec. 5, 1944

2,364,133

UNITED STATES PATENT OFFICE 2,364,133

SEAL JOINT

Joaquin J. de la Roza, Sr., New York, N. Y.

Application January 3, 1944, Serial No. 516,819

4 Claims. (Cl. 285—97.1)

This invention relates to improvements in seal joints and refers more particularly to the joints or seals between the ends of stationary and rotating vessels.

The joint is particularly useful in processes where it is important to prevent inter-mixing of the fluids contained in inner and outer concentric vessels. Where the outer vessel has the function of a steam jacket, it is usually important to prevent dilution or contamination of the material being processed with the heating fluid or escape of the contents of the inner vessel into the surrounding jacket. In industrial processes such as the digesting of vegetable material to recover cellulose in the manufacture of paper pulp or other cellulose derivatives or in any process where it is advantageous to employ concentric stationary and rotating vessels and a pressure-tight annular space or chamber therebetween, the seal may be used. An advantage of the seal joint is its ability to maintain a pressure-tight seal at the joint between such inner and outer concentric vessels.

The seal joint has the further advantage of compensating for considerable elongation differences of the inner and outer vessels produced by uneven heating.

Another advantage is the flexible control and adjustment of the pressure imposed upon the contacting surfaces forming the seal. The joint is simple in design, inexpensive to construct and easy to assemble and dismantle when repair or replacement of parts is necessary. Other advantages will be obvious from the specification which follows.

Figure 1:
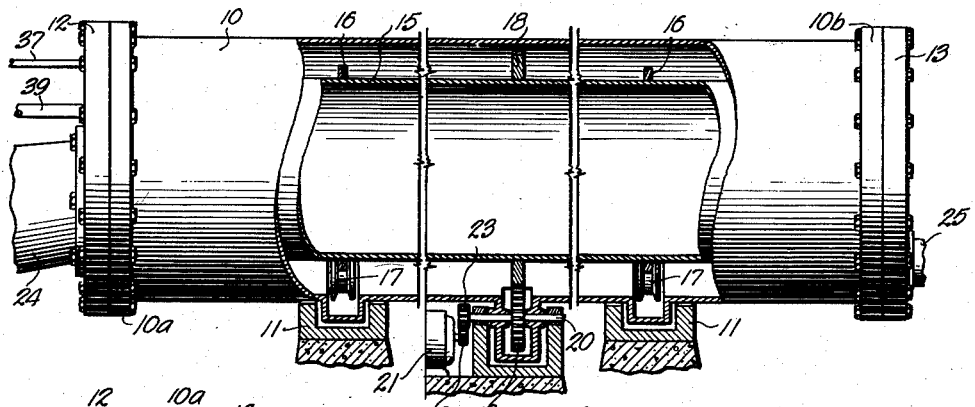

In the accompanying drawing which forms a part of the specification and are to be read in conjunction therewith, and in which like reference numerals are used to indicate like parts in the various views, Fig. 1 is a side view with parts broken away showing diagrammatically a digesting apparatus for the production of pulp by a continuous method.

Figure 2:
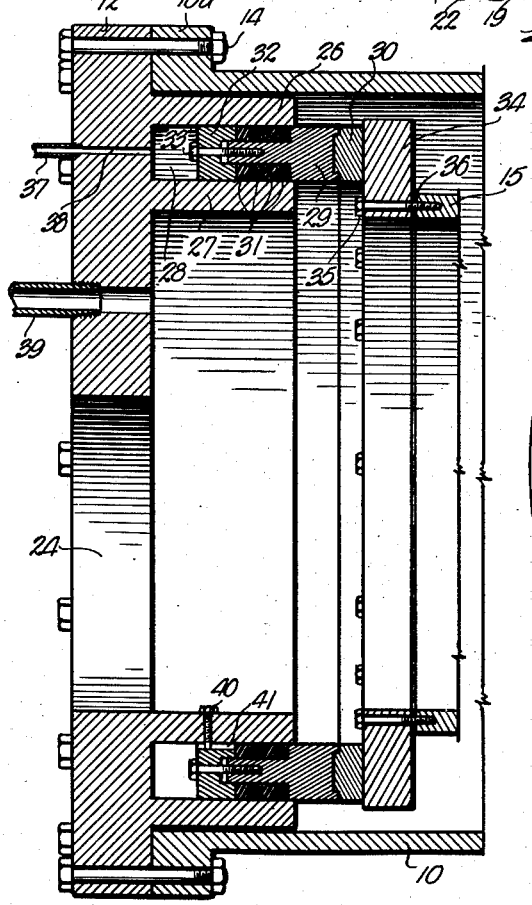
Figure 3:
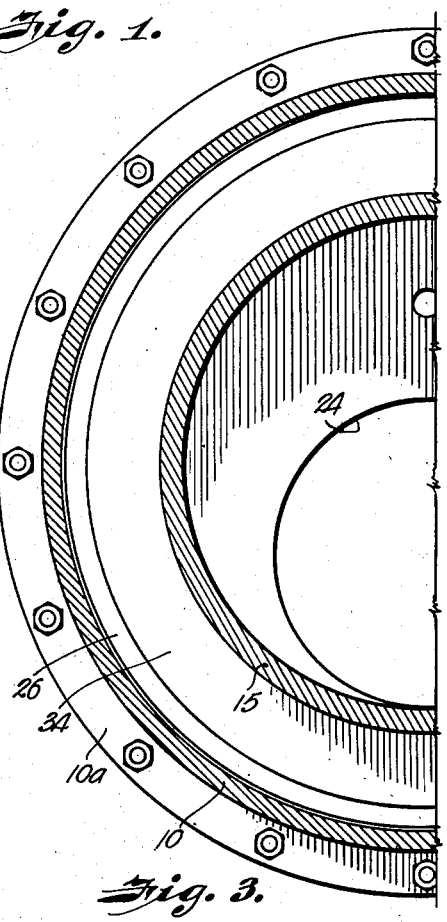

Fig. 2 is an enlarged sectional view of the end of the digester showing the seal joint in detail, Fig. 3 is an end view of one-half of the digester shown in Fig. 2.

Illustrative of a typical installation wherein the invention is employed would be where an outer stationary vessel functions as a steam jacket surrounding an inner rotating chamber as shown in the accompanying drawing.

Referring to the drawing, at 10 is shown an outer stationary vessel carried by supports diagrammatically shown at 11. The vessel is closed at its ends by cover plates or heads designated by the numerals 12 and 13. These heads are attached to the vessel 10 by flanges 10a and 10b. The covers or heads are attached to the flanges by means of bolts 14. Within vessel 10 and having a common axis therewith is a smaller rotating vessel 15. Vessel 15 has a plurality of tracks 16 on its periphery which support the rotating vessel and run on rollers 17 mounted within the stationary vessel. The manner of supporting the inner rotating vessel is conventional in the art and forms no part of the present invention. Centrally of the rotating vessel is a girth gear 18 which meshes with a pinion 19 mounted on shaft 20. This shaft is driven from a motor 21 through a train of meshing gears 22 and 23. At one end of the vessel material to be treated is introduced through inlet pipe 24 and after being processed is discharged from the opposite end through the outlet pipe 25.

Referring now to the seal joint which forms the principal subject matter of the instant invention and is shown best in Fig. 2. This joint is duplicated at the opposite ends of the digester, sealing the inner vessel from the outer vessel. For this reason the seal joint will be explained as it occurs at the inlet end of the vessel and it is to be understood that a similar joint is located at the opposite end of the vessel to maintain a like seal between the inner and outer vessels at the discharge end.

On the inner face of the cover within the outer shell of the stationary vessel are formed two circular ridges or rings 26 and 27. Between these rings is an annulus 28. Fitted into this annular space 28 is a piston assembly. This piston assembly comprises an annular piston 29 on one side of which is attached a shoe 30 and on the other side, packing rings 31 hold in place by an annular gland 32. The gland is fastened to the piston by means of bolts 33. To the end of the rotary cylinder 15 is attached a slide ring 34. Bolts 35 extending through the slide ring into the end of the vessel hold the ring rigidly in place and by means of a gasket 36 between the ring and vessel assure a pressure-tight seal at this point. A side surface of the slide ring contacts the bottom of shoe 30 and forms the seal joint between the inner and outer vessels. The contacting pressure between the surfaces of the shoe and seal ring is regulated by the ffuid pressure above the piston within the annular space 28. This pressure fluid is introduced through pipe 37 which has connection with the piston chamber through duct 38 in the cover plate 12. A pipe 39 which is tapped into the head 12 furnishes a means for supplying liquor to the inner vessel separately from material introduced through inlet 24. Other apertures may be made through the head if it is desired to utilize control equipment for maintaining proper pressure and temperature conditions within the inner vessel. Likewise, the outer vessel may be equipped with control mechanism for maintaining proper pressures and temperatures on the fluid circulating therethrough. These details while essential to the operation of the digester form no part of the instant invention.

The distance between the slide ring and the edges of the rings forming the annulus in which the piston reciprocates should be sufficient to permit removal of the piston when it is necessary to tighten the packing or adjust the piston for any reason.

To prevent rotation of the piston keying means such as bolts 40 are screwed through inner ring 27 of the annulus and their ends extend into slots 41 around the inner surface of the piston. These bolts permit axial movement of the piston but prevent its rotation.

The character of the packing used in the piston will depend upon the service for which it is employed. High temperatures and high pressures will necessitate a different type of packing from lower pressure and temperature conditions. The character of the metals used both in the piston, shoe and slide ring will be covered to a great extent by the conditions existing within the vessels. A lead ring may be used in the shoe to counteract the corrosive effects of acids and stainless steel used on the slide ring as a contacting surface. Where high temperatures are employed above the melting point of lead a more resistant metal must be employed. Thus, the conditions within the vessels will govern the materials which are best adapted for the service.

Slight irregularities due to lack of concentricity of the two vessels will be readily accommodated by the contacting seal surfaces and the flexibility of the piston in the cylinder. Differential elongation of the rotating and stationary vessels 15 and 10 will be compensated for by axial movement of the piston assembly. Thus, regardless of the different temperature, pressure or fluid differences within the two vessels there will be maintained constantly at the joint a fluid-tight, efficient seal.

From the foregoing it will be seen that my invention is one well adapted to attain all of the ends and objects hereinbefore set forth together with other advantages which are obvious and which are inherent to the structure.

Having thus described my invention, I claim:

1. A seal joint between a stationary and a rotating vessel mounted on a common axis comprising an annulus formed in the end of one vessel, a slide ring fixedly attached to the other vessel, an annular piston assembly having a circular shoe intermediate the annulus and slide ring, said piston axially movable in the annulus, said slide shoe rotatably contacting the circular shoe and means for imposing fluid pressure upon the piston for controlling the sealing contact between the slide ring and shoe.

2. A joint, as in claim 1, in which the piston is sealed within the annulus with packing rings and an adjustable gland.

3. A joint, as in claim 1, including keying means for the piston rotatably fixed and axially movable in the annulus and adapted to prevent rotation of the piston assembly.

4. A seal joint between a stationary and a rotating vessel mounted on a common axis comprising an annulus formed in the end of the stationary vessel, a slide ring fixedly attached to the adjacent end of the rotating vessel, an annular piston assembly having a circular shoe intermediate the annulus and slide ring, said piston axially movable in the annulus, said slide shoe rotatably contacting the circular shoe and means for imposing fluid pressure upon the piston for controlling the sealing contact between the slide ring and shoe.

JOAQUIN J. DE LA ROZA, SR.